May 31, 1949. P. E. HAWKINS 2,471,429
MOUNTING FOR THE DRIVING AND OPERATING
MECHANISMS OF INDUSTRIAL TRUCKS
Filed Oct. 4, 1944 7 Sheets-Sheet 3

INVENTOR.
PAUL E. HAWKINS.
BY Geo. B. Pitter
Attorney

May 31, 1949.  P. E. HAWKINS  2,471,429
MOUNTING FOR THE DRIVING AND OPERATING
MECHANISMS OF INDUSTRIAL TRUCKS
Filed Oct. 4, 1944  7 Sheets-Sheet 4

INVENTOR.
PAUL E. HAWKINS.
BY
Geo. B. Teter
Attorney

INVENTOR.
PAUL E HAWKINS
BY Geo. B. Pitts
   Attorney

May 31, 1949.  P. E. HAWKINS  2,471,429
MOUNTING FOR THE DRIVING AND OPERATING
MECHANISMS OF INDUSTRIAL TRUCKS
Filed Oct. 4, 1944  7 Sheets-Sheet 6

INVENTOR.
PAUL E. HAWKINS.
Geo. B. Pitts
attorney

May 31, 1949.  P. E. HAWKINS  2,471,429
MOUNTING FOR THE DRIVING AND OPERATING
MECHANISMS OF INDUSTRIAL TRUCKS
Filed Oct. 4, 1944  7 Sheets-Sheet 7

INVENTOR.
PAUL E. HAWKINS.
BY
Attorney

Patented May 31, 1949

2,471,429

UNITED STATES PATENT OFFICE 2,471,429

MOUNTING FOR THE DRIVING AND OPERATING MECHANISMS OF INDUSTRIAL TRUCKS

Paul E. Hawkins, Lakewood, Ohio, assignor to The Baker-Raulang Company, Cleveland, Ohio, a corporation of Ohio Application October 4, 1944, Serial No. 557,172

5 Claims. (Cl. 180—54)

This invention relates to a vehicle particularly adapted for industrial uses. The disclosed embodiment of the invention for exemplification thereof consists of an elevating type of industrial truck, but certain features of the invention are applicable to a vehicle of the tractor type.

One object of the invention is to provide an improved vehicle having a power plant and a transmission in unitary relation yieldingly supported on the vehicle chassis and connected at one end to the housing for the driven axle sections for the vehicle, whereby the mounting is free to vibrate about the axis of the driven wheels, while maintaining the power plant and transmission in fixed relation and the latter in operative relation to the power transmitting elements for the axle sections of the driven wheels.

Another object of the invention is to provide in a vehicle an improved arrangement of power plant, transmission and axle mechanism for the driven wheels of the vehicle, wherein provision is made for ready access to the clutch and clutch shaft, the latter being mounted for displacement or removal to permit adjustment, removal and replacement of the clutch and/or parts thereof.

Another object of the invention is to provide in a vehicle an improved arrangement of power plant, transmission and axle mechanism for the driven wheels of the vehicle, the housing sections for the clutch, transmission and axle mechanism being arranged to permit ready displacement or removal of the clutch shaft and the sections for the clutch and transmission having separate openings to permit easy access to each thereof, whereby adjustment, removal and replacement of the clutch and/or parts thereof may be made.

Another object of the invention is to provide an improved industrial truck having a chassis mounted on rear wheels and front driving wheels, an elevating mechanism supported at the front end of the chassis, and a power plant, a transmission and power transmitting elements for driving the axle for said front wheels, the housings for the power plant, transmission and power transmitting elements being rigidly connected together and oscillatable about the axis of said front wheels and yieldably supported on the rearward portion of said chassis.

Another object of the invention is to provide an improved industrial truck consisting of a chassis mounted on rear wheels and front driving wheels, an elevating mechanism supported at the front end of the chassis, a power plant, a transmission between the power plant and the axle for the driving wheels and truck controlling devices spaced from the power plant to provide a driver's station and ready access to the transmission.

Another object of the invention is to provide an improved industrial truck having a pair of driving wheels, a power plant and a transmission, including a clutch and clutch shaft, between the power plant and the axle for the driving wheels, the front wall of the housing for the transmission having a bearing for the outer end of the clutch shaft, which bearing is removable to permit outward endwise movement of the shaft and a portion of the top wall of the housing being removable to permit removal and replacement of the clutch.

Other objects of the invention will be apparent to those skilled in the art to which my invention relates from the following description taken in connection with the accompanying drawings, wherein.

Figure 6:
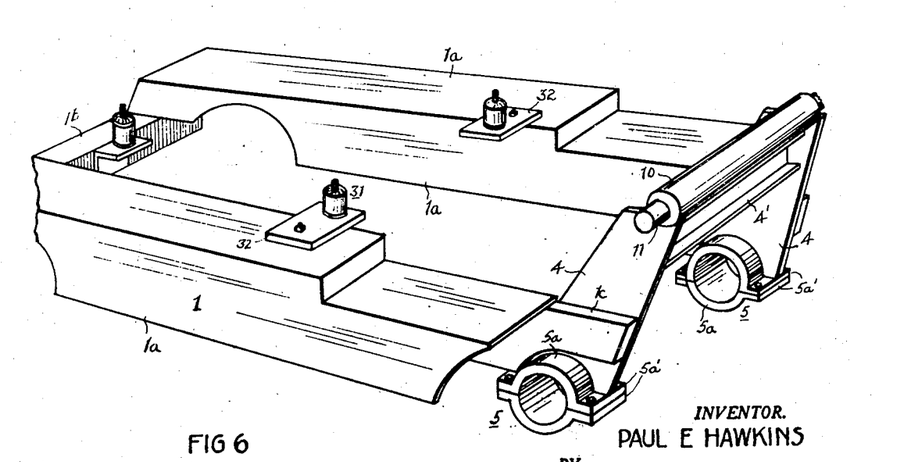
Fig. 6 is a perspective view of the truck chassis.
Figure 7:
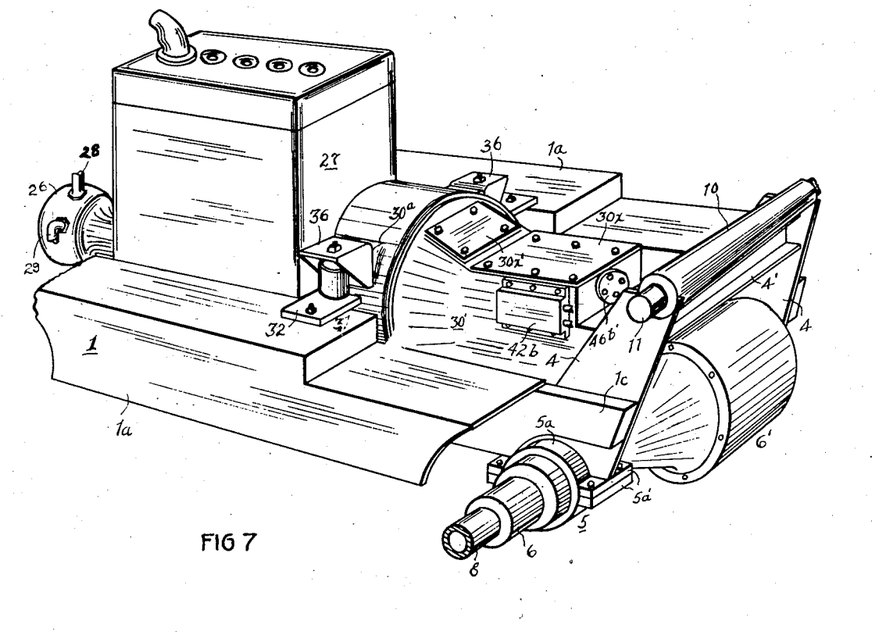
Fig. 7 shows in perspective the assembly of the chassis, power plant, transmission and housing for the power transmitting mechanism and driven axles.

In the drawings 1 indicates as an entirety the truck chassis, having depending front and rear hangers 2, 2, to which the opposite ends of suitable springs 2a are connected in a well known manner, the springs being connected to the axle 1' for one wheel, but preferably a pair of rear wheels 3, whereby the latter support the rear end of the chassis 1. The spindles for the rear wheels 3 are mounted on suitable knuckles 3a and connected together by a suitable linkage 3b, the latter in turn being connected by a rod 3c and gearing 3d to the shaft in a steering column 3d' having a steering wheel 3d". As shown in Figs. 6 and 7, the chassis 1 comprises a pair of spaced parallelly related inverted channel members 1a rigidly connected at their rear ends by a cross member 1b. The inner side walls of the channel members 1a are provided with plates 1c, which extend outwardly beyond the front ends of the channel members 1a. 4 indicates a pair of uprights each rigidly secured (preferably welded) to the adjacent extended end of the adjacent plate 1c. The upper end portions of the uprights 4 are connected by a channel 4', the opposite ends of the latter preferably being welded to the uprights. The lower ends of the uprights 4 are provided with alined collars 5 through which extend the tubular sections 6 of a housing, indicated as an entirety 6' (later referred to), the sections 6 being free to rotate or oscillate in the collars, as later set forth. Each collar 5 consists of related semi-circular members 5a each having flanges 5a' which are bolted to the flanges 5a' of the other member, the upper member 5a and its flanges being welded to the lower end of the adjacent upright 4.

Figure 8:
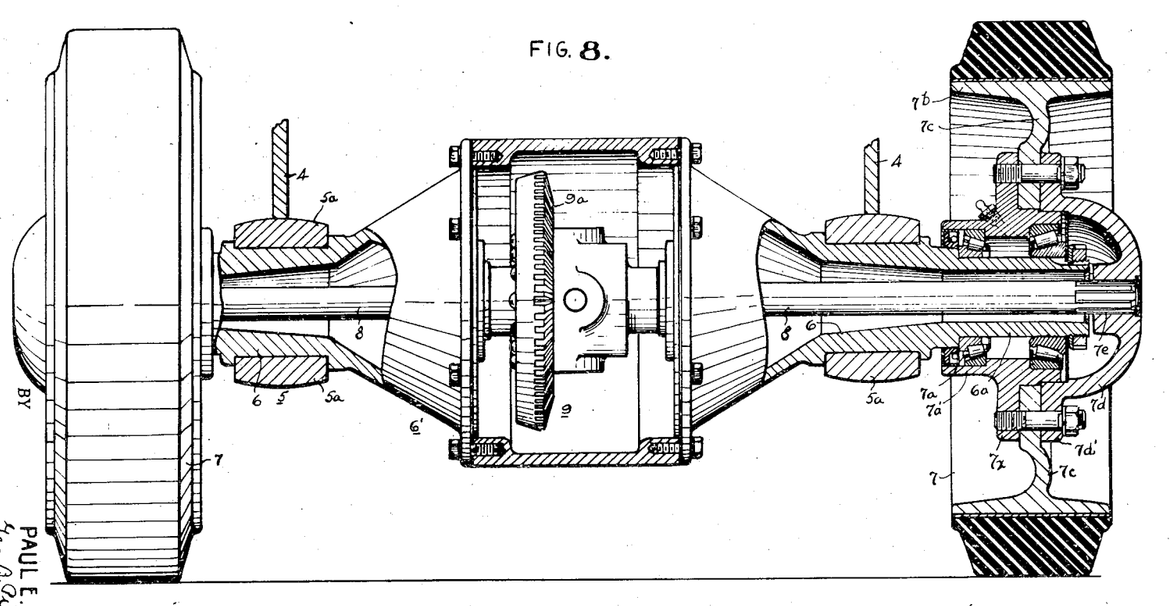
Fig. 8 is a section on the line 8—8 of Fig. 9.

The outer end portions 6a of the housing sections 6 form the axles on which the front wheels 7 rotate. Suitable anti-friction bearings 7a, preferably of the tapered roller type, are interposed between the axle portions 6a and the wheel hubs 7a' (see Fig. 8). Each wheel 7 preferably consists of a rubber tired rim 7b provided internally with an annular web 7c to the inner side of which an annular flange 7x on the hub 7a' is bolted and a hub cap 7d having a peripheral flange 7d' which is bolted to the outer side of the web 7c. Each cap 7d is formed with a through opening 7e, the walls of which are splined to receive the outer splined end of the adjacent live axle section 8, the latter being drivingly connected to a differential mechanism, indicated as an entirety at 9, whereby the adjacent wheel 7 may be driven.

From the foregoing description it will be observed that the front ends of the chassis members 1a are connected through the uprights 4 and collars 5 to the housing sections 6 which form the axles for the front wheels, so that the latter support the front end of the chassis 1.

The upper ends of the uprights 4 are formed with recesses to provide seats in which a transverse rod is rigidly secured, the opposite ends of the rod being reduced to form pivots or trunnions 11 on which an elevating mechanism, indicated as an entirety at 12, is swingably or tiltably mounted.

Figure 4:
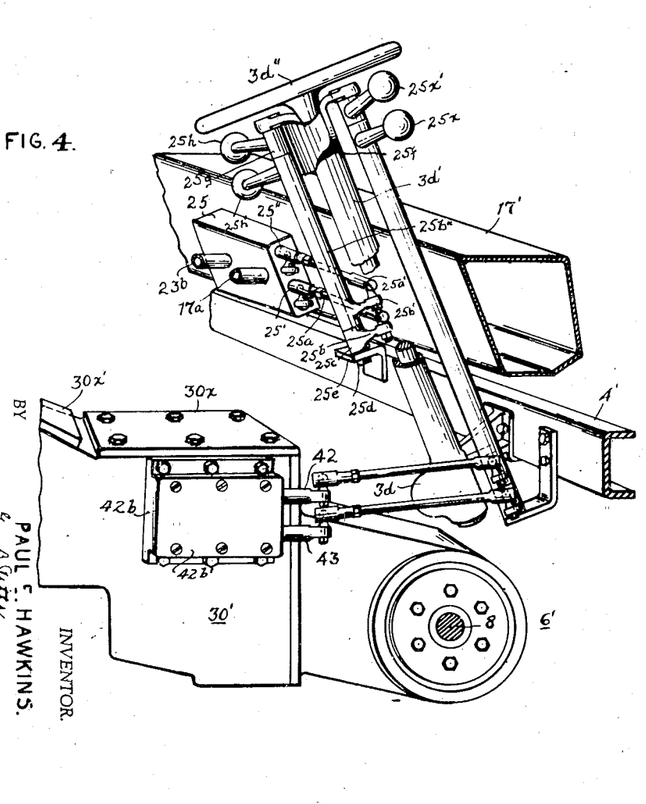
Fig. 4 is a fragmentary perspective view.

The elevating mechanism 12 comprises the following: 13 indicates a frame consisting of a pair of spaced channel members 13' connected together at their lower ends by a cross member 13a and at their upper ends by a bar 13b fixed to brackets 13b' extending rearwardly from the channel members 13'. Intermediate their ends the channel members 13' are provided with rearwardly extending plates 13c, the outer end portions of which are formed with aligned openings to receive the trunnions 11, whereby the frame 13 is swingably mounted, as already set forth. The outer end portions of the plates 13c are formed with aligned slots 13c', each leading to the adjacent trunnion opening, to permit assembly of the channel members on the trunnions 11. 14 indicates a load carrier consisting of a frame 14a supporting at its upper end a transverse rod 14a' on which are adjustably mounted a pair of forks 14b, whereby the forks may be spaced relatively to each other dependent on the load to be handled and transported. The upper end of the frame 14a is provided with a rear wall 14c and a front wall 14d to form a seat for the upper end of the upright leg of each fork 14b (see Fig. 1a), the wall 14c being formed with spaced openings 14c', whereas the leg of each fork 14b is provided with a rearwardly extending pin 14e arranged to extend into one of the openings 14c' to lock the fork against lateral movement. The frame 14a is provided at its opposite sides with upper and lower rearwardly extending pairs of arms 15, each having a stud shaft for supporting a roller 16 arranged to engage the front and rear walls of an adjacent channel member 13x, the upper and lower rollers 16 serving to guide the load carrier 14 endwise of the channel members 13x. The channel members 13x slidably fit the members 13' for movement upwardly and downwardly therein, and are connected together at their upper ends by tie member 13x', which is arranged to engage the upper ends of the members 13', whereby the latter limit the downward movement of the members 13x. 17 indicates a cylinder disposed midway between the channel members 13' and having a closed lower end supported on the cross member 13a. 18 indicates a piston within the cylinder 17 and arranged to be operated endwise upwardly by fluid (such as a suitable oil) supplied under pressure through a pipe 17a (see Figs. 4, 5 and 11) leading from a valve mechanism (later referred to) and connected to the lower end of the cylinder 17, as later set forth. The upper end of the piston 18 is provided with a yoke 18a having on its opposite ends a pair of sprockets 19, which are engaged by chains 20. One end of each chain 20 is anchored to an angle 21 fixedly mounted on the cross member 13a, whereas its opposite end is connected to lugs 22 on the lower end of the load carrier frame 14a (see Fig. 5). In this arrangement it will be observed that operation of the piston 18 upwardly will effect operation of the load carrier upwardly relative to the channel members 13'. When fluid pressure is applied to the piston 18, the carrier 14 will be initially moved upwardly until the yoke 18a engages the tie member 13x' and then continued movement of the piston will raise the channel members 13x the full stroke of the piston, but due to the anchorage of the chains 20 at one end and their connection with the carrier 14 at their opposite ends, the operation of the piston 18 will simultaneously move the carrier 14 with the channel members 13x and relatively thereto (but at a faster rate—approximately twice the rate of movement of the channels 13x), so that the carrier may be raised to any desired level and/or to the upper ends of the channel members 13x when the latter are raised to their extreme upper position by the full stroke of the piston 18. By cutting off the supply of the fluid through the pipe 17a to the cylinder 17 and connecting it to the tank 17' to permit discharge of the fluid from the cylinder 17, the members 13x, the load carrier 14 and piston 18 will gravitate downwardly to their lowermost position.

Figure 1:
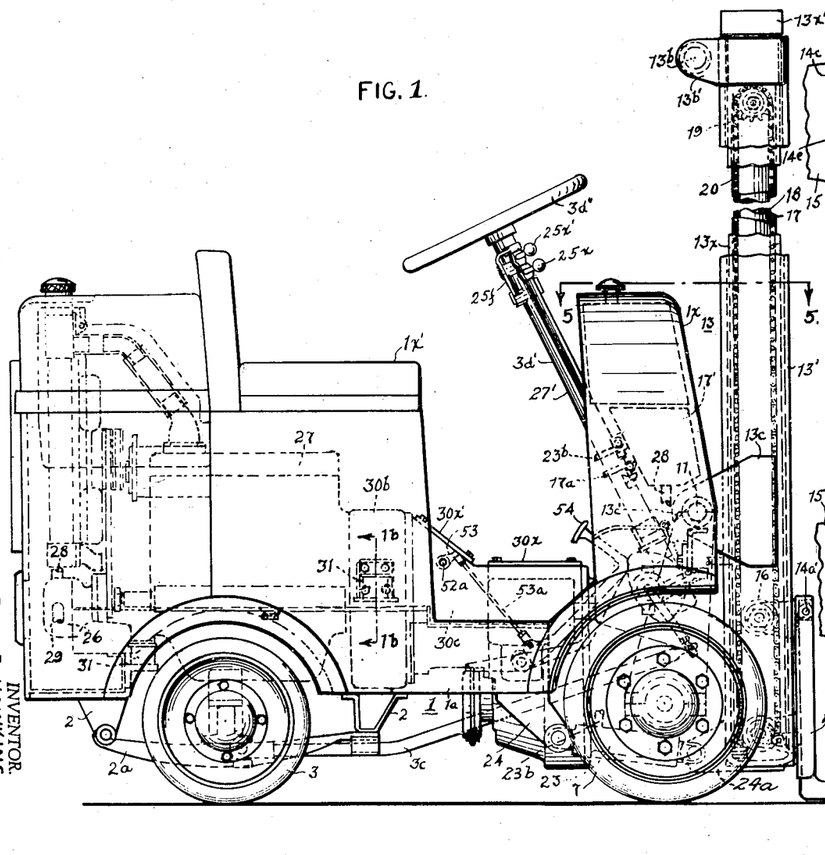
Fig. 1 is a side elevation of an industrial truck embodying my invention.
Figure 1A:
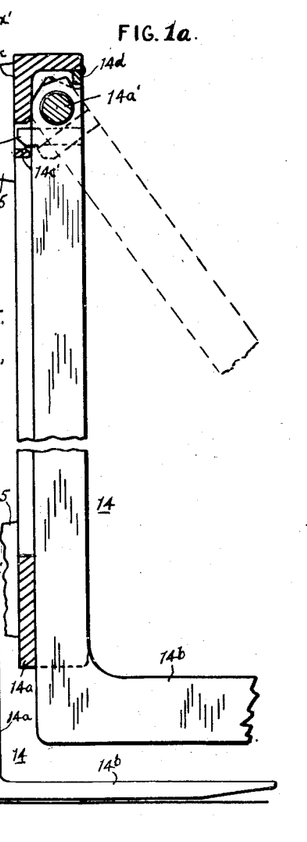
Fig. 1a is a detail sectional view of the carrier for the elevating mechanism (enlarged) on the line 1a—1a of Fig. 2.
Figure 5:
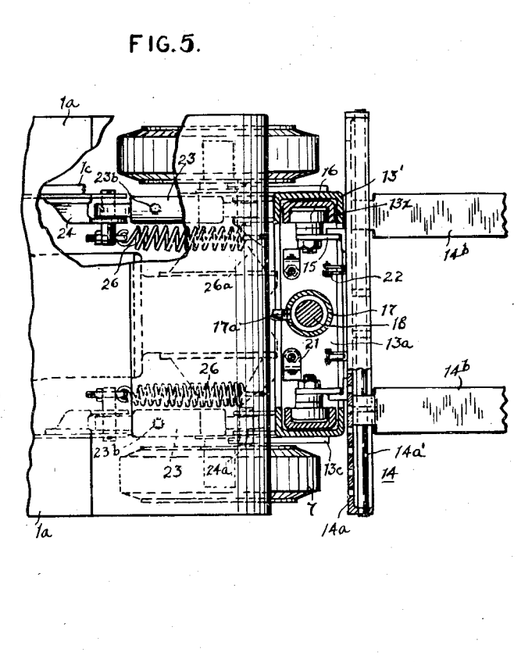
Fig. 5 is a fragmentary plan view partly in section substantially on the line 5—5 of Fig. 1.

The means for tilting the elevating mechanism 12 comprise a pair of cylinders 23 pivotally mounted at their inner ends on the outer ends of a pair of brackets 24, which depend from the chassis members 1a (see Figs. 1 and 5). The cylinders 23 are provided with pistons 23a which are pivotally connected to the outer ends to a pair of brackets 24a fixed to the channel members 13'. The inner end portion of each cylinder 23 is provided with a fluid supply pipe 23b leading from a valve mechanism (later referred to), so that when the fluid under pressure is supplied to the cylinders 23, as later set forth, the pistons will be operated outwardly, the effect of which is to swing the elevating mechanism 12 on the trunnions 11 in one direction; that is, the upper end of the mechanism inwardly. Springs 26, adjustably connected to pivots for the cylinders 23 at their inner ends and at their outer ends to gussets 26a fixed to the cross member 13a, are put under tension when the elevating mechanism 12 is swung inwardly, as above described, so that when the fluid supply pipe 23b is connected through the adjacent valve mechanism to the tank 17', as later set forth, the springs 26 serve to swing the elevating mechanism 12 back to its normal position, as shown in Fig. 1.

Figures 10, 11:
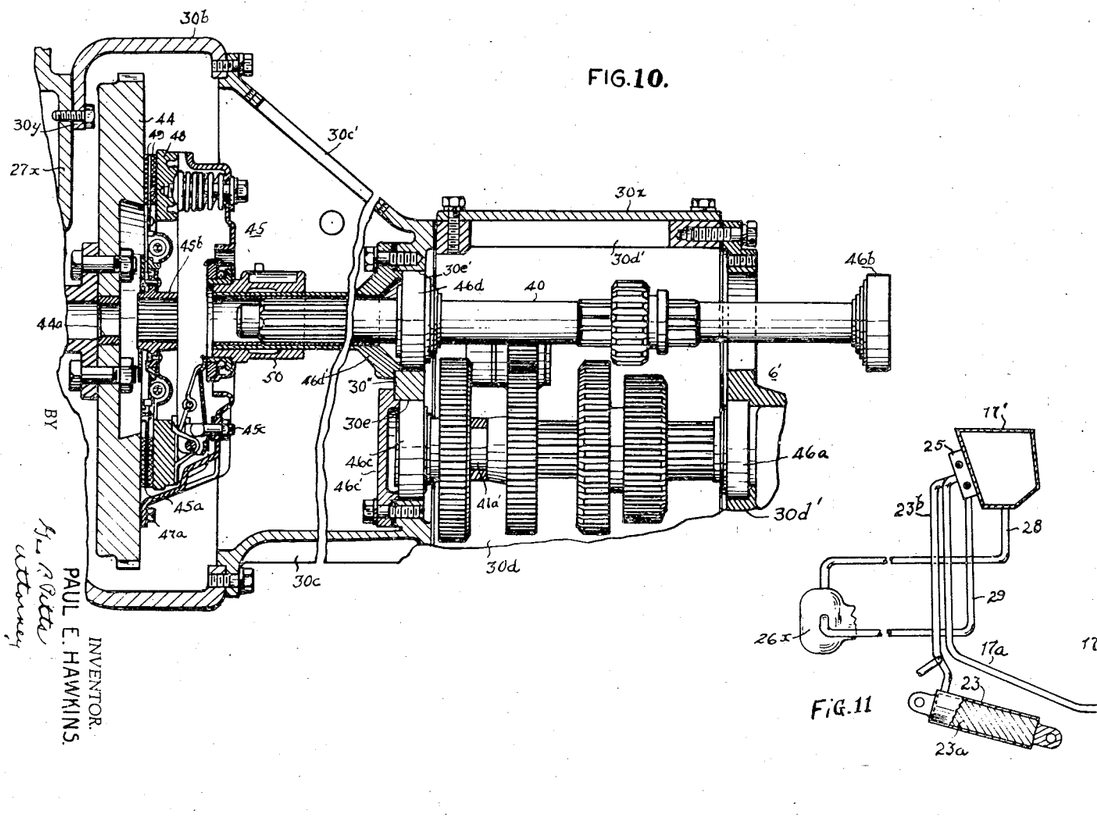
Fig. 10 is a sectional view of parts shown in Fig. 9, showing the position of the clutch shaft when the clutch is to be removed.
Fig. 11 is a diagram of the hydraulic system for operating the elevating mechanism and tilting it.

The supply of fluid to and from the cylinders 17 and to and from the two cylinders 23 is separately controlled by valve mechanisms enclosed in a casing 25, which is preferably mounted on the inner side wall of the tank 17', so that the raising and lowering of the elevating frame 14 and bodily tilting of the elevating mechanism 12 may be separately or conjointly controlled. The valve element of the valve mechanism which controls the flow of fluid to and from the cylinder 17 is operated by a plunger 25', whereas the valve element of the valve mechanism which controls the flow of fluid to and from the cylinders 23 is operated by a plunger 25". The supply of fluid is shown in Fig. 11, wherein 26x indicates a suitable pump driven in any desired manner by the motor or power plant indicated as an entirety at 27. 27 indicates a pipe leading from the tank 17' to the intake side of the pump 26x. 29 indicates a pipe leading from the discharge side of the pump 26x to the casing 25, for the valve mechanisms, which in turn are connected to the pipes 17a, 23b, respectively. The valve mechanisms control the flow of fluid from the pipe 29 to each of the pipes 17a, 23b, or to the tank 17' for circulation therethrough and pipe 28 provides a return of the fluid to the pump 26x; for example, in one position of the plunger 25' for controlling the fluid flow to and from the cylinder 17, the fluid is by-passed into the tank 17' for return flow through pipe 28 to the pump 26x and flow of the fluid into or from the pipe 17a is cut off; in another position of plunger 25', the pipe 29 is connected to the pipe 17a for supply of fluid to the cylinder 17 and flow of the fluid from pipe 29 through the adjacent valve mechanism to tank 17' is cut off; and in another position of the plunger 25', if the elevating frame 14 is in an elevated position and is to be lowered, the fluid in the cylinder 17 flows from the latter through the pipe 17a, the adjacent valve mechanism into the tank 17' and pipe 28 for circulation in the system by the pump 26x. If the elevating frame 14 has been raised to an elevated position and is to be maintained therein, the plunger 25' is moved to its first position, which connects pipe 29 through the adjacent valve mechanism to the tank 17' and cuts off the pipe 17a to prevent flow of the fluid therein in either direction. The plunger 25" for operating the valve mechanism which controls the flow of the fluid to and from the cylinders 23 operates similarly to the plunger 25'. The valve mechanisms and their connections with the tank 17', and pipes 17a, 23b, 29, are not shown as they and these connections form no part of the present invention. The plunger 25' is pivotally connected to one end of a link 25a, the opposite end of which is pivotally connected to an arm 25b. The arm 25b is provided with a hub 25c which is fixed to a sleeve, the latter in turn being rotatably mounted on a shaft 25d. The lower end of the shaft 25d is mounted in a bracket 25e carried by the channel 4', whereas its upper end is mounted in a bracket 25f supported on the steering column 3d'. The upper end of the sleeve is fixed to the hub 25g of an operating handle 25h extending laterally and disposed below and in convenient relation to the steering wheel 3d", whereby the plunger 25' may be moved to the positions already referred to. The plunger 25" is pivotally connected to one end of a link 25a', the opposite end of which is pivotally connected to an arm 25b' fixed to the lower end of a sleeve 25b" rotatably fitting the inner sleeve between the hubs 25c, 25g, the upper end of the sleeve 25b" being provided with an operating handle 25h' extending laterally substantially in line with and below the handle 25h, whereby the plunger 25" may be moved to the positions already referred to.

The power or driving mechanism for the wheels 7 comprises the power plant 27 (such as a four cylinder internal combustion engine of suitable construction), supplied with gasoline from a tank 27' (see Fig. 1), a transmission 30 and the differential 9 connected to the axle sections 8 in a well known manner.

As shown in Figs. 1, 4, 7 and 9, the housing, indicated as an entirety at 30' for the transmission 30 is rigidly connected to the front wall 27x of the power plant 27 and housing 6' for the differential 9 and axle sections 8 to form a unitary assembly supported on a plurality of yieldable or cushioning devices, each indicated as an entirety at 31, to permit vertical vibrations of the assembly due to operation of the truck over rough surfaces and incident to starting and stopping of the truck. As the tubular sections 6 of the housing 6' rotatably fit the collars 5, which are concentric to the axis of the wheels 7, the assembly, when vibrating, oscillates about an axis which is co-axial to the axis of these collars and the wheels 7. I preferably provided three cushioning devices 31, one at either side of the housing 30' between it and the channel members 1a and one at the rear of the power plant 27, between it and the cross member 1b, as will be apparent from Figs. 1, 6 and 7. Each cushioning device 31 at opposite sides of the housing 30' consists of a base plate 32 the outer end portion of which is supported on and preferably bolted to the top wall of the adjacent channel member 1a (see Fig. 1b). The inner end portion of the plate 32 is formed with an opening 32a and supports a tubular member 33 in concentric relation thereto, the tubular member preferably being welded to the plate 32. 34, 34a, indicate concentrically related sleeves supporting between them an annular mass of yieldable material, such as rubber or rubber composition 35, the outer and inner walls of which are secured (by vulcanization) to the opposed walls of the sleeves 34, 34a. As shown, the outer sleeve removably fits the tubular member 33 and is provided on its upper end with an annular flange 34b engaging the upper end of the tubular member 33, whereby the latter supports the sleeves 34, 34a, and cushioning material 35, but permits distortion of the cushioning material due to vibrations of the power plant 27 and transmission mechanism 30, as already set forth. 36 indicates a bracket suitably fixed to a pad 30a provided on the side wall of the housing 30', the laterally extending wall 36a of the bracket supporting a bolt 37 which extends downwardly therefrom through a spacing ring 37x and the sleeve 34. The bolt 37 is provided with upper and lower collars 38, 38a, which engage the opposite ends of the sleeve 34 and cushioning material 35, the spacing ring 37x being disposed between the upper collar 38 and bracket wall 36a. By preference the head of the bolt 37 engages the lower collar 38a to provide the nut 37a for the bolt at its upper end to facilitate ready access thereto. The nut 37a serves to clamp the bracket 36, ring 37x, collars 38, 38a, sleeve 34 and bolt 37 in fixed relation to avoid lost motion, looseness and rattle therebetween, and provide for the direct application of the forces incident to vibrations of the power plant and driving mechanism on the cushioning material 35, relative to the chassis 1.

Figures 1B, 9:
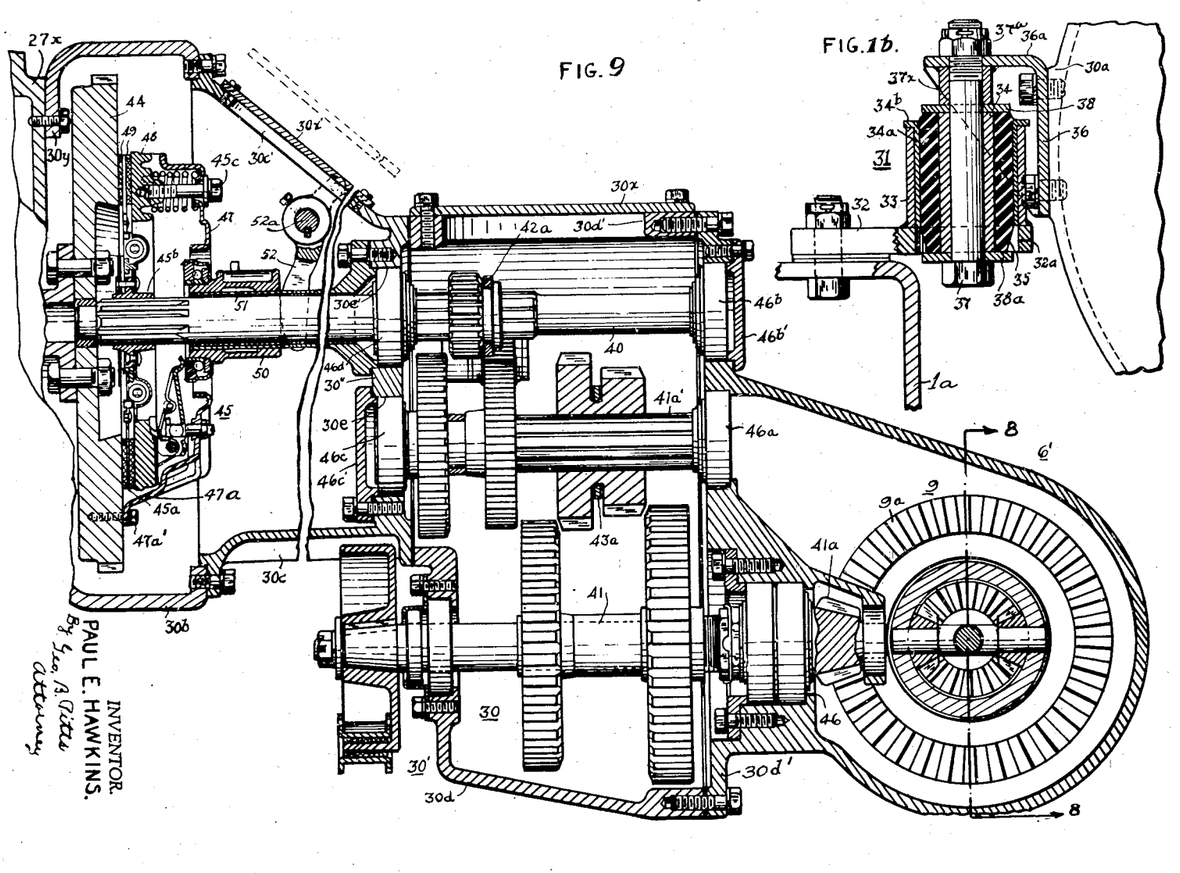
Fig. 1b is a fragmentary section on the line 1b—1b of Fig. 1, enlarged.
Fig. 9 is a fragmentary section on the line 9—9 of Fig. 2 through the transmission and clutch.
Figure 2:
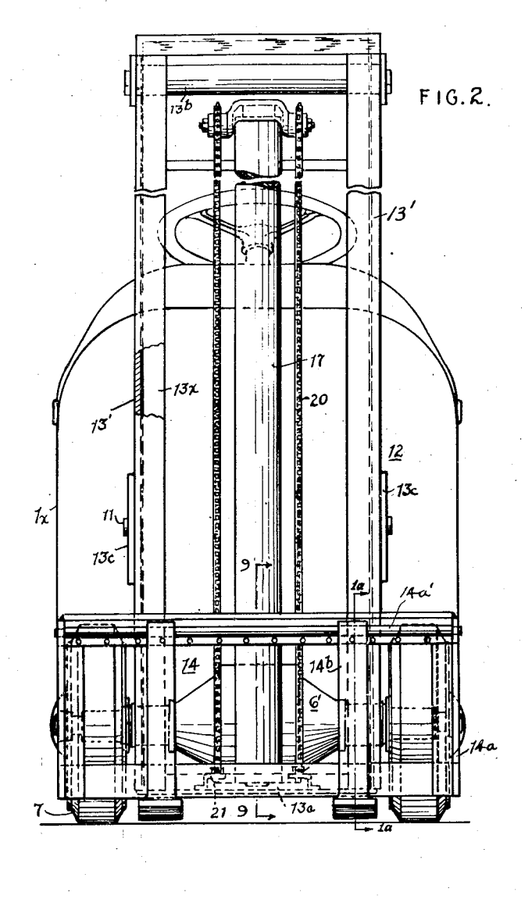
Fig. 2 is a front elevation.
Figure 3:
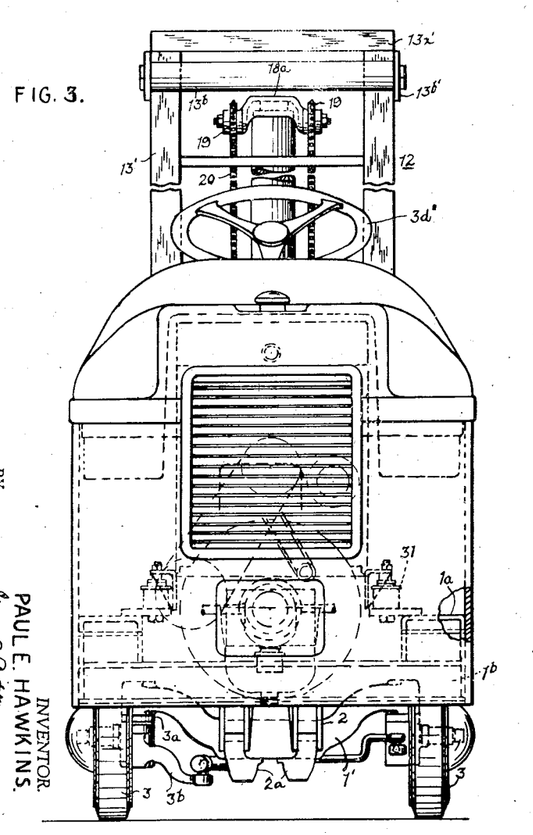
Fig. 3 is a rear elevation.

The cushioning device 31 rearwardly of the power plant 27 is similar in construction to the device 31 shown in Fig. 1b, except that the base plate consists of an angle secured to the side wall of the cross member 1b. As will be observed, the vibratory forces are transmitted by each bracket 36 through the ring 37x, upper collar 38 to the sleeve 34 and cushion 35, which absorbs such forces to avoid damage to the driving mechanism or chassis, as well as to minimize jolting of the truck driver.

The transmission 30, which may be of any desired construction, includes a clutch shaft 40 and a driven shaft 41 carrying the pinion 41a in mesh with the main gear 9a of the differential mechanism 9. Suitable gears are arranged between the shafts 40 and 41 to provide the desired speeds for driving the truck in either direction and to reverse the direction of rotation of the shaft 41, the change in speed being effected by operation of a plunger 42 and reverse of rotation of the shaft 41 being effected by operation of a plunger 43 (see Fig. 4). The connections between the plungers 42, 43 and the yokes 42a, 43a, respectively, for shifting the transmission gears are not shown as they may be of the conventional type or of any preferred form of construction, the yoke 42a being removable or replaceable to permit endwise movement of the shaft 40. The plungers 42, 43, are slidably mounted in a casing 42b mounted on the side wall of the housing 30' and provided with a removable cover 42b'. 25x, 25x' indicate operating handles in alined relation disposed on the opposite side of the steering column 3d' from the handles 25h, 25h', the connections between the handles 25x, 25x', and the plungers 42, 43, respectively, and the mountings therefor being similar to like parts for the handles 25h, 25h', for which reason it will not be necessary to describe such connections and their mountings.

The transmission housing 30' consists of sections 30b, 30c, 30d, rigidly connected together, the inner section 30b having a flange 30y bolted to the wall 27x of the power plant 27 and extending around a fly wheel 44 and a clutch, indicated as an entirety at 45, the outer section 30d being connected to a transverse wall 30d' forming part of the housing 6' and the intermediate section 30c co-operating with the section 30b to enclose the fly wheel 44 and the clutch 45. The transverse wall 30d' is formed with openings which provide seats for suitable removable anti-friction bearings indicated at 46, 46a, 46b, the latter bearing supporting the outer end of the clutch shaft 40 and secured in its seat by a removable cap 46b'. The section 30c is provided with an outer end wall 30" formed with openings 30e, 30e', which serve as seats for a bearing 46c for the jack shaft 41a' and a bearing 46d for the clutch shaft 40. The bearings 46c, 46d, are secured in their seats by removable caps 46c', 46d', respectively. The inner reduced end of the clutch shaft 40 is rotatably supported in a bushing 44a fixedly mounted in the fly-wheel 44. By removing the cap 46b', the clutch shaft 40 may be moved endwise, as shown in Fig. 10, preparatory to removal of the clutch plate 45a, as later set forth. The upper wall of the housing section 30d is formed with an opening 30d' which is closed by a removable cover or plate 30x, the opening permitting ready access to the transmission, whereas the upper wall of the housing section 30c is formed with an opening 30c', which is closed by a removable cover or plate 30x', the opening permitting ready access to the clutch 45 for adjustment thereof, its removal and replacement or parts thereof, upon the endwise displacement of the shaft 40, as shown in Fig. 10. It will be observed that by forming separate openings in the housing section 30c and 30d for access to the clutch 45 and the transmission 30, either cover 30x, 30x', may be removed to permit access to the parts in one section without exposing the parts in the other section. Accordingly, a relatively few cap screws need to be removed; in fact, only one part (a cover) requires disassembly, as shown in dotted lines in Fig. 9. In this form of construction the wall 30" is formed integrally with the side, top and bottom walls of the section 30c, so that the bearings 46c, 46d, are rigidly supported in alinement with their related bearings 46a, 46b, respectively.

The clutch 45 may be of any desired construction, but preferably of the single plate type having a casing 47 provided with lateral extensions 47a (one only being shown) removably fixed by cap screws 47a' to the fly-wheel 44 and adjustably carrying an annular pressure member 48. The pressure member 48 and flywheel 44 are provided with suitable alined friction surfaces 49 disposed upon opposite sides of the clutch plate 45a, for engagement therewith and disengagement therefrom. The clutch plate 45a is provided with a hub 45b, the inner wall of which is splined to provide a slidable driving connection with the splines on the inner end of the clutch shaft 40, whereby, with the shaft 40 in normal position (Fig. 9), the clutch plate is drivingly connected to the shaft, but the latter may be disengaged from the hub 45b when displaced endwise outwardly (Fig. 10). The pressure member is operatively connected with a collar 50 slidably fitting a sleeve 51, which surrounds the shaft 40, the collar in turn being operated in one direction by a yoke 52 fixed to a rock shaft 52a which is mounted in the side walls of the housing section 30c. Outwardly of the housing section 30c, the rock shaft 52a is provided with an arm 53, which is connected through a link 53a to the clutch pedal 54 (see Fig. 1).

In the arrangement shown, upon removal of the cover 30x' and displacement of the shaft 40, as shown in Fig. 10, the clutch adjusting screws 45c are readily accessible. Also, by removing the screws 47a' and displacing the casing 47, the clutch plate 45a may be removed through the opening 30c' and a new plate replaced. In carrying out this replacement operation, only the bearing cap 46b' and cover 30x' are detached and yoke 42a displaced or removed to provide quick access to the clutch 45, and no disassembly of the transmission and/or its bearings is required.

As shown in Fig. 1, the fluid tank 17' and gasoline tank 27' are positioned in a jacket 1x, which is open on its inner side below these tanks to make the cap 46b' freely accessible and a space to accommodate the clutch shaft 40 when moved endwise outwardly, as shown in Fig. 10; it is also to be observed that these tanks and the steering column 3d' are spaced from the power plant 27 to provide free access to the covers 30x, 30x' and the driver's station therebetween, as well as a seat 1x' over a front portion of the power plant; furthermore, this arrangement positions the power plant 27 remote from the elevating mechanism 12, whereby its weight is advantageously utilized to counterbalance any load being raised or transported on the elevating frame 14.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a vehicle of the class described, the combination of a chassis, wheels for supporting one end of said chassis, said chassis being provided at its opposite end with spaced collars, a housing having laterally extending tubular members rigidly connected thereto and rotatably fitting said collars and extending therethrough, wheels rotatably mounted on the outer end portions of said tubular members, a differential in said housing drivingly connected to said last mentioned wheels, a unitary power mechanism for driving the last mentioned pair of wheels through said differential, said mechanism consisting of a power plant and a transmission enclosed in a housing, said last mentioned housing being rigidly connected to the front wall of said power plant and said first mentioned housing, and yieldable supporting means between said mechanism and said chassis, whereby the vibrations of said mechanism about the axis of said driven wheels relative to said chassis are dampened.

2. In a vehicle construction, the combination with a wheel mounted chassis and power means thereon for driving certain wheels of the vehicle, of a support on said chassis provided with a hollow member, a bracket fixed to a wall of said power means, and cushioning means between said hollow member and said bracket, said cushioning means comprising inner and outer annular members, resilient means between and connected to said inner and outer members, said outer member being supported on said hollow member, an element depending from said bracket and extending through said inner member, a device on the lower end of said elements engaging the lower end of said inner member, and a spacing device on said depending element between said bracket and the upper end of said inner member.

3. In a vehicle of the class described, the combination of a chassis provided with spaced collars at its front end, a pair of steerable wheels for supporting the rear end of said chassis, a front pair of wheels, a differential drivingly connected to said front wheels, a housing for said differential having laterally extending tubular members rigidly connected thereto and rotatably fitting and extending through said collars, bearings on the outer end portions of said tubular members for said front wheels, whereby the front end of said chassis is supported on the latter and said housing and tubular members are free to rotate in said bearings, a unitary power mechanism drivingly connected to said differential, consisting of a power plant, a transmission between said power plant and said differential and a housing for said transmission between and rigidly connected to a wall of said power plant and the housing for said differential, and yieldable means between said unitary power mechanism and said chassis for dampening the vibrations of said power mechanism relative to said chassis about the axis of said front wheels.

4. In a truck of the class described, the combination with a chassis, of tubular members rotatably mounted intermediate their inner and outer ends in one end of said chassis, bearings provided on the outer end portions of said tubular members, a pair of wheels mounted on said bearings for supporting the adjacent end of said chassis, a wheel for supporting the opposite end of said chassis, a unitary power mechanism for driving said pair of wheels, said power mechanism consisting of a power plant and driving connections having driven axles extending through said tubular members and operatively connected to said pair of wheels and a housing fixedly related to the front wall of said power plant and the inner ends of said tubular members, whereby said power mechanism is free to oscillate in said bearings, and yieldable means between said power mechanism and said chassis arranged to dampen vibrations of said power mechanism relative to said chassis about the axis of said pair of wheels.

5. In a vehicle construction, the combination with a wheel mounted chassis and power means thereon for driving certain of the wheels for said chassis, of a bracket on said chassis provided with a hollow member, a separate bracket fixed to a wall of said power means, and cushioning means between said hollow member and said separate bracket, said cushioning means comprising inner and outer annular members, resilient means between and connected to said inner and outer members, said outer member being supported on said hollow member, an element depending from said second mentioned bracket and extending through said inner member and devices on the opposite ends of said depending element, the device on the lower end of said depending element engaging the adjacent end of said inner member and the device on the upper end of said depending element engaging said separate bracket, one of said devices consisting of a nut threaded on the adjacent end portion of said depending element and adapted to secure the upper end of said inner member in fixed relation to said separate bracket and said depending element to the latter.

PAUL E. HAWKINS.

REFERENCES CITED

The following references are of record in the file of this patent:

UNITED STATES PATENTS

| Number | Name | Date |
|---|---|---|
| 2,001,029 | Kulick et al. | May 14, 1935 |
| 2,074,946 | Stoner | Mar. 23, 1937 |
| 2,141,234 | Anderson | Dec. 27, 1938 |
| 2,253,592 | Wahlberg | Aug. 26, 1941 |
| 2,299,445 | Weaver | Oct. 20, 1942 |
| 2,304,040 | Ulinski | Dec. 1, 1942 |
| 2,307,857 | Rodler | Jan. 12, 1943 |
| 2,349,064 | Weaver | May 16, 1944 |
| 2,368,121 | Dunham | Jan. 30, 1945 |